United States Patent
Mark et al.

[11] Patent Number: 5,189,487
[45] Date of Patent: Feb. 23, 1993

[54] MULTIOSCILLATOR RING LASER GYROSCOPE LOCAL OSCILLATOR-BASED OUTPUT OPTICS DETECTION SYSTEM

[75] Inventors: John G. Mark, Pasadena; Daniel A. Tazartes, West Hills; Tae W. Hahn, Chatsworth, all of Calif.

[73] Assignee: Litton Systems, Inc., Beverly Hills, Calif.

[21] Appl. No.: 796,567

[22] Filed: Nov. 21, 1991

[51] Int. Cl.5 ............................................. G01C 19/64
[52] U.S. Cl. .................................................. 356/350
[58] Field of Search ............................ 356/350; 372/94

[56] References Cited

U.S. PATENT DOCUMENTS

| | | | |
|---|---|---|---|
| 4,123,162 | 10/1978 | Sanders | 356/106 |
| 4,415,266 | 11/1983 | Matthews | 356/350 |
| 4,429,997 | 2/1984 | Matthews | 356/350 |
| 4,449,824 | 5/1984 | Matthews | 356/350 |
| 4,813,774 | 3/1989 | Dorschner | 350/622 |
| 4,818,087 | 4/1989 | Dorschner | 350/622 |
| 4,836,675 | 6/1989 | Hendow | 356/350 |
| 5,116,132 | 5/1992 | Mitchell et al. | 356/350 |

FOREIGN PATENT DOCUMENTS 0080512  4/1987  Japan ................................... 356/350

OTHER PUBLICATIONS

Laser Applications; Monte Ross; Academic Press; 1971; pp. 133–200.
Multioscillator Laser Gyros; Weng W. Chow, et al.; IEEE Journal of Quantum Electronics, vol. QE-16, No. 9, Sep. 1980.

*Primary Examiner*—Samuel A. Turner
*Attorney, Agent, or Firm*—L. David Rish; M. Michael Carpenter

[57] ABSTRACT

A rotational sensing system for a multioscillator ring laser gyroscope is disclosed herein that can operate with a simple upright symmetric optics mechanism, where the required signal separation is performed fully electronically, with the use of a local oscillator. The technique allows for rotational rate and direction detection, as well as cavity length control, with a minimum of cross-talk.

9 Claims, 3 Drawing Sheets

MULTIOSCILLATOR RING LASER GYROSCOPE LOCAL OSCILLATOR-BASED OUTPUT OPTICS DETECTION SYSTEM

BACKGROUND OF THE INVENTION

1. Field of the Invention

This invention relates to ring laser gyroscope output optics detection systems, and more particularly, it relates to an output optics system for a multioscillator sensor which provides a local oscillator-based electronic separation of Sagnac effect modulated Faraday biased beat frequency signals without the need for complex optical signal processing and components.

2. Description of the Related Art

The Ring Laser Gyroscope has been developed as a logical replacement for the mechanical inertial gyroscope. Based upon the principles of the Sagnac Effect, ideally the ring laser gyroscope has minimal moving parts allowing extremely accurate rotational sensing. As originally envisioned, the ring laser gyroscope has at least two counter-propagating electromagnetic waves (such as light) which oscillate within an optical ring cavity. When the ideal ring laser gyroscope is stationary, no rotation is indicated by the sensor. As the ring cavity of the laser gyroscope is rotated about its central axis, the counter-propagating waves interact so that a beat frequency is developed. A linear relationship between the beat frequency and the rotation rate of the gyroscope with respect to the inertial frame of reference may be established.

Although the ideal ring laser gyroscope is characterized by a beat note proportional to the rotational rate, the two mode planar ring laser gyroscope requires rate biasing or mechanical dithering to prevent counter propagating waves from locking at low rotation rates. Mode locking is a major difficulty at low rotation rates where the ring laser gyroscope produces a false indication that the device is not rotating. If the rotation rate of a ring laser gyroscope starts at a value above that of where lock-in occurs, and is then decreased, the frequency difference between the beams disappears at a certain input rotation. This input rotation rate is called the lock-in threshold. The range of rotation rates over which lock-in occurs is generally called the dead band of the ring laser gyroscope. Lock-in arises from the coupling of light between the beams. Today, the only means of overcoming the lock-in effect of the counter-propagating modes of light within a two mode gyroscope is to mechanically dither the mirrors or body of the gyroscope or to apply a continuous angular rate to the gyroscope. A more detailed explanation of the problems associated with a planar two mode gyroscope are described in *Laser Applications*, edited by Monte Ross, pages 133–200 (Academic Press, 1971).

Since one of the primary benefits of a ring laser gyroscope is that it overcomes the need for mechanical or moving parts, a body dithered planar two mode gyroscope does not truly meet this goal. In an effort to achieve a fully optical ring laser gyroscope, the out-of-plane multi-mode or multioscillator ring laser gyroscope was developed to overcome the effects of mode locking without the need to dither. The terms "multimode" and "multioscillator" refer to four modes of electromagnetic energy that propagate simultaneously in the cavity as opposed to the usual pair counter-propagating linearly polarized modes that exist in the conventional two mode gyroscope. A detailed discussion of the operation of the multi-oscillator laser gyroscope is presented in the article by Chow, et. al., at pages 918–936, *IEEE Journal of Quantum Electronics*, Vol. QE-16, No. 9, September 1980. In an effort to solve the lock-in problem, non-planar multioscillator ring laser gyroscopes have been developed, having more than one pair of counter propagating modes.

Briefly, the basic multi-oscillator ring laser gyroscope operates with left circularly polarized (LCP) and right circularly polarized (RCP) light beams and uses a Faraday effect glass device within the cavity or magnetic field on the gain plasma to provide a frequency shift between the counter-propagating waves to prevent mode locking. An example of this theory of multioscillator ring laser gyroscope may be found in U.S. Pat. No. 4,818,087 entitled "*ORTHOHEDRAL RING LASER GYRO*" issued Apr. 4, 1989 to Raytheon Corporation (Terry A. Dorschner, inventor); and U.S. Pat. No. 4,813,774 entitled "*SKEWED RHOMBUS RING LASER GYRO*" issued Mar. 21, 1989 to Raytheon Corporation(Terry A. Dorschner, et. al., inventor). The nonplanar ray path produced in a multioscillator ring laser gyroscope ensures circular polarized reciprocally split light. The nonplanar ray path reciprocally rotates the polarizations by many degrees yielding the necessary high purity circular polarization. The nonplanar reciprocal phase shift also achieves two Faraday biased gyroscopes, the gain curve 10 of which is illustrated in PRIOR ART FIG. 1. The nonplanar ray path splits the light through its geometry into two separate gyroscopes, one being left circulatory polarized and the other right circulatory polarized. This splitting is known as reciprocal splitting and typically is in the range of 100 MHz–1,000 MHz. By placing a Faraday element in the beam path of a nonplanar ring laser gyroscope, when the proper magnetic field is applied to the Faraday glass element, nonreciprocal splitting of each gyroscope is achieved. As shown in FIG. 1, at least four modes are produced: a left circularly polarized anti-clockwise ($L_a$) frequency 12, a left circularly polarized clockwise ($L_c$) frequency 14, a right circularly polarized clockwise ($R_c$) frequency 16, and a right circularly polarized anti-clockwise ($R_a$) frequency 18. The Faraday splitting (between 12 and 14, shown as GYRO 1, and 16 and 18, shown as GYRO 2) between clockwise and anti-clockwise modes is about 1 MHz. At least four corner mirrors, 22, 24, 26, and 28 form the ring resonator path, which contains the two gyroscopes symbolized by their respective gain curves of FIG. 1. The partially transmissive corner mirror 28 allows light to leave the resonator and fall upon the prism 30 and onto a set of photo-electronic transducers, such as the quadrature-spaced photodetectors 44 (HET A and HET B) for signal processing. (These photodetectors are usually, but not limited to, photodiodes.) When the signals are subtracted during the electronic processing to remove the Faraday bias, the scale factor of the gyroscope is doubled over the conventional ring laser gyroscope. The nonplanar geometry multioscillator ring laser gyroscope using a Faraday element is currently designed using a gas discharge pump to provide the active medium, which medium occupies a portion of the light beam path. Reflections and backscatter from the intra-cavity element and instabilities of the magnetic field associated therewith cause difficulties that need to be overcome in order to build a fully optical navigational grade multi-oscillator ring laser gyroscope.

In the planar ring laser gyroscope or the multi-oscillator laser gyroscope system, it is necessary to extract a portion of each beam propagating within the laser cavity to produce output signals, which represent the difference in frequency between wave pairs having the same sense of polarization within the cavity (one pair for the planar configuration; two pairs for the multi-oscillator). For example, in planar ring laser gyroscope systems, rotational information is obtained by combining the oppositely directed waves. In the ideal case of a uniformly rotating laser, the frequencies of the waves are slightly different.

The planar gyroscope has a device for combining its oppositely directed beams to obtain a read out which includes a dielectric mirror mounted on one side to the ring laser gyroscope body. Mounted to the opposite surface of the mirror, a prism assembly (which preferably may be an upright symmetric prism) is used to form a fringe pattern. The prism is directly mounted to the mirror to minimize vibrations.

In the planar gyroscope output optics, the fringes are a measure of the instantaneous phase difference between the oppositely directed beams. For the case when the intensities are matched and counter propagating beams are nearly collinear, the fringe pattern is stationary. When the laser gyroscope is rotated, the fringe pattern moves at the beat frequency rate. If the fringe spacing is considerably larger than the dimensions of a photodetector, a measurement of the rotation rate can be made by simply recording the rate at which the intensity maximum moves past the detectors.

The direction is which the fringe pattern moves past the detectors determines the sense of rotation. By using two detectors spaced at 90°; or a quarter fringe apart, and a logic circuit, both positive and negative counts can be accumulated to give rotation rate and sense. It should be noted that with this type of readout, the laser gyroscope is inherently a rate integrating gyroscope with a digital output. Thus, with up-down counting, the net number of accumulated counts depends only on the net angle through which the ideal gyroscope is rotated. One complete revolution of the gyroscope would produce on the order of $10^6$ counts. In summary, the output optics detection system for the planar ring laser gyroscope is relatively straight forward.

The same cannot be said for the multioscillator ring laser gyroscope. Multimode ring laser gyroscopes as known in the art may employ optical crystals and Faraday effect devices to shift the frequency of the laser beams. Heretofore, the biasing and detection schemes which have been proposed have been unduly complex and have had high noise levels associated with them. This was acknowledged as early as 1977 in U.S. Pat. No. 4,123,162 issued to Sanders and assigned to the common assignee of this application. In order to solve the problem of biasing and detecting output signals from a multioscillator ring laser gyroscope, the Sanders '162 patent was directed to a scheme of rotation direction determination through a circuit which dithered the laser plasma current, and used the AC component from the plasma power supply as a phase standard for detecting the sign or direction of rotation of the ring laser gyroscope. Sanders '162 superimposes a differential AC dithering voltage onto the DC voltage of the plasma power supply. A phase reference voltage is synchronized with the AC dither of the plasma and is applied to the synchronous demodulator 78 of Sanders '162. A slight change in the plasma current reduces one beat frequency (characteristic of one gyroscope contained within the multioscillator) and increases another beat frequency. The Sanders circuitry determines the direction of rotation by determining whether the signal is in phase or out of phase with the phase reference signal. Sanders '162 uses a single photodetector to achieve its rotation rate and rotation sense measurements. Sanders '162 also discloses a maximum intensity seeking path length control servo which is not easily adaptable by most multioscillators used due to the complex nature of the intensity curves exhibited in such a scheme.

Another scheme for rotation rate and rotational direction sensing is disclosed in the following U.S. Pat. Nos. 4,415,266; 4,429,997; and, 4,449,824, all issued to Matthews. Patent '266 and Patent '997 are directed to a phase-locked loop system for a multioscillator ring laser gyroscope, while the U.S. Pat. No. '824 is directed to the structure of the output optics. A complex output optics detector prism structure is disclosed by Matthews, which includes three mirrors (22, 40, and 41), a beamsplitter (42), a set of quarter-wave plates (43 and 53), a set of polarizers (44 and 54), and a set of detector diodes (45 and 55) (as shown in FIG. 2 of the U.S. Pat. No. 4,449,824). The electronic signal processing systems disclosed in the '266 and '997 patents are used to process the heterodyned optical output signals provided by complex optics as discussed in the '824 patent. The Matthews' patents are all directed to an overall system which requires complex optics to separate the beam pairs in the multioscillator. Matthews employs a path length control system which compares the optical intensity of each pair of signals to produce a path length control error signal. The problems which arise when using complex output optics (besides the difficulty of manufacturing a bulky mechanical structure and optical alignment) include severe optical signal attenuation, and measurement accuracy problems associated with optical signal backscatter. It therefore is desirable to provide an output optics structure and system which is free from the confinement of complex optical signal processing.

One attempt to simplify the output optics system is disclosed is U.S. Pat. No. 4,836,675, issued Jun. 6, 1989 (Martin and Hendow, inventors) and assigned to the common assignee of this application. In this case, the applicants used straight forward optics (similar to the output optics used in a dithered planar ring laser gyroscope system) and rather complex electronics to achieve the goal of measuring rotation rate and sense, as well as achieving cavity length control, in a multioscillator ring laser gyroscope system. The system that U.S. Pat. No. 4,836,675 discloses for cavity length control attempts to discriminate the amount of envelope modulation depth to determine the gyroscope's operating point, using no additional photodetectors than what is required for a planar gyroscope; however, the proposed electronic system for processing the optical output signals are rather complex, and therefore subject to signal degradation and noise, as well as higher cost implementation.

U.S. patent application Ser. No. 07/464,164, filed Jan. 12, 1990, now U.S. Pat. No. 5,116,132 granted May 26, 1992, discloses an alternative system of Four mode detection which uses RC circuits to separate heterodyne signals received from the heterodyne optical detectors. The method disclosed in the referenced patent must account for significant cross-talk phenomena arising when the heterodyne detectors are not exactly 90° apart. Also, the system disclosed in the referenced patent requires precision adjustments under severe bandwidth constraints.

SUMMARY OF THE INVENTION

It appears from a discussion of the related Art in the Background of the Invention that a multi-oscillator ring laser gyroscope local oscillator-based output optics detection system is needed to separate the pairs of signals derived from the optical signals in the gyroscope cavity using straight forward output optics prism and electronics, yet accomplish this goal with low or reduced cross-talk.

An invention is disclosed which is directed to a multi-oscillator ring laser gyroscope rotational sensing system, including an output optics detection system, which comprises an output prism, affixed to an output mirror of a ring resonator cavity of a multioscillator ring laser gyroscope, suitable for heterodyning multiple frequency optical signals; a photo-electronic transducer for electronically detecting the multiple frequency optical signals; and, a local oscillator-based electronic signal separation circuit for processing a high frequency electronic output signal corresponding to the multiple frequency optical signals in the form of Sagnac effect modulated Faraday biased beat frequency signals (a specialized form of suppressed carrier modulated signals). The high frequency optical signals may be grouped into left and right circularly polarized pairs, each pair of signals having a clockwise component and an anti-clockwise component. The difference between the two beat frequency signals determines the rotation rate. The direction or sense of rotation may be determined by determining which of the two beat frequency signals is a higher or lower frequency with respect to the other beat frequency.

The prism produces a heterodyned carrier optical output signal in the form of a Sagnac effect modulated Faraday biased beat frequency signal; and, the heterodyned optical signal is detected by the photo-electronic transducer which provides a high frequency electronic signal to the signal separation circuit. The local oscillator-based signal separation circuit then processes this high frequency electronic signal, and produces separated output signals from which rotation rate, sense of rotation, and gyroscope cavity length control may be determined and effectuated. The local oscillator-based signal separation circuit 50 electronically separates the Sagnac effect modulated Faraday biased beat frequency signal into two frequency output signal components. These separated output signal components, 2CA Cos $(\omega_c - \omega_a)t$ and 2CB Cos $(\omega_c - \omega_b)t$ have a range from as low as 0.5 MHz and as high as 20 MHz, and are related to each of the circularly polarized Faraday biased gyroscopes circulating within the optical pathway of the gyroscope, so that rotational rate and direction may be measured, and cavity length control may be achieved.

In a preferred embodiment, the photo-electronic transducer device may include a set of at least two photodetectors separated a predetermined phasor distance apart. In further detail, the signal separation circuitry would include: a local oscillator producing a local oscillator signal which is mixed with the Sagnac effect modulated Faraday biased beat frequency signal from the output of a first photodetector; at least one phase shifter circuit, to phase shift the local oscillator signal before such signal is mixed with the Sagnac effect modulated Faraday biased beat frequency signal from a second photodetector; and, a set of at least two combining circuits, each of the combining circuits combining the local oscillator-mixed, Sagnac effect modulated Faraday biased beat frequency signal from a first photodetector with a phase-shifted, local oscillator mixed, second Sagnac effect modulated Faraday biased beat frequency signal from a second photodetector (after such signals have been low pass filtered). One of each of said combining circuits sums these signals, while the other combining circuit takes a difference of these signals. As a result, two signals are generated, one each containing the beat frequency of each polarization pair.

DETAILED DESCRIPTION OF THE PREFERRED EMBODIMENT

Figure 2:
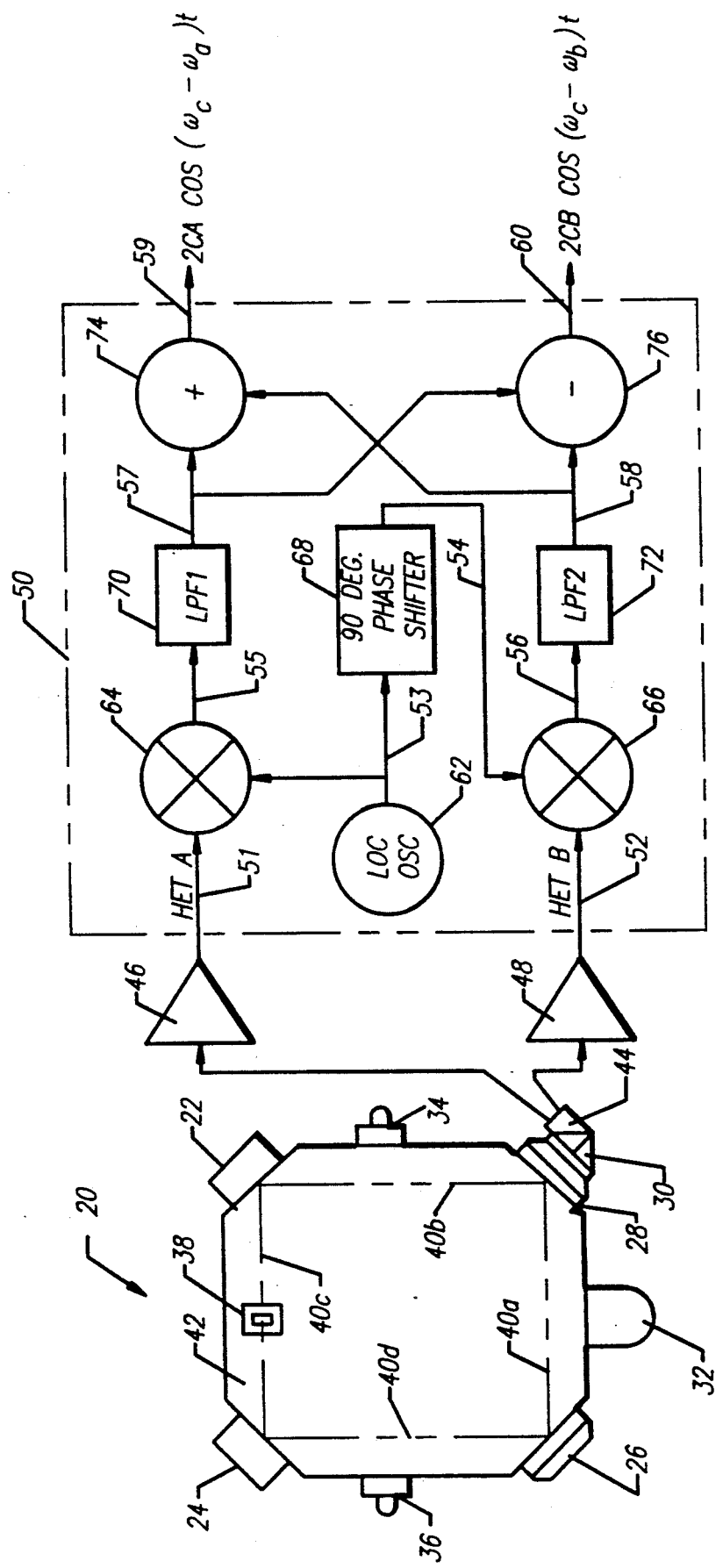
FIG. 2 is a schematic diagram of a preferred embodiment of the Rotational Sensing system for a multioscillator ring laser gyroscope having a local oscillator-based signal separation circuit included within the output optics detection system of this invention.

With reference to FIG. 2, there is disclosed an output optics detection system 50 for detecting and decoding the optical signal rotational and rate information provided by the upright symmetric prism assembly 30 of the multioscillator ring laser gyroscope. The multioscillator ring laser gyroscope 20 is comprised of a monolithic block or frame 42 made from a single material glass such as ZERODUR made by Schott of West Germany. The frame contains an optical pathway 40 $a$-$d$ defined by four corner mirrors 22, 24, 26, and 28. The gaseous gain medium present in the optical pathway 40 is normally excited Helium-Neon Gas. The activation of this medium is accomplished by activation of the anodes 34 and 36, and the cathode 32. (An alternative configuration, not shown, is also operable, and comprises a single anode positioned between two cathodes.) Reciprocal splitting of the light beams travelling along the optical pathway 40$a$-$d$ is provided by the nonplanar geometry of the gyroscope, providing left and right reciprocal circularly polarized light (RCP) and (LCP). (The nonplanar configuration is achieved by folding the optical pathway 40$a$-$d$ along an imaginary fold line (not shown) connecting opposing corner mirrors 22 and 26.) A Faraday rotator assembly (with magnets) 38 provides non-reciprocal splitting between clockwise and anti-clockwise components of each set of LCP and RCP light. This non-reciprocal splitting is on the order of one megahertz (1 Mhz), but may be anywhere within the range of 0.5 to 20 MHz. The readout optics prism system 30 is comprised of a pair of upright symmetric prisms joined in such a fashion to produce the single upright symmetric prism assembly and mounted upon partially transmitting mirror 28; and, a set of quadrature-spaced photodetectors 44 (HETS A and B). A pair of detector amplifiers 46 and 48 provide boosted signals to the inputs 51 and 52 of the signal separation circuitry 50. These signals (along the electrical pathways leading through input terminals to the preamplifiers) represent an electronic analog of, and correspond to, the optically heterodyned output signal present at the diagonal surface of the upright symmetric prism 30.

Figure 1:
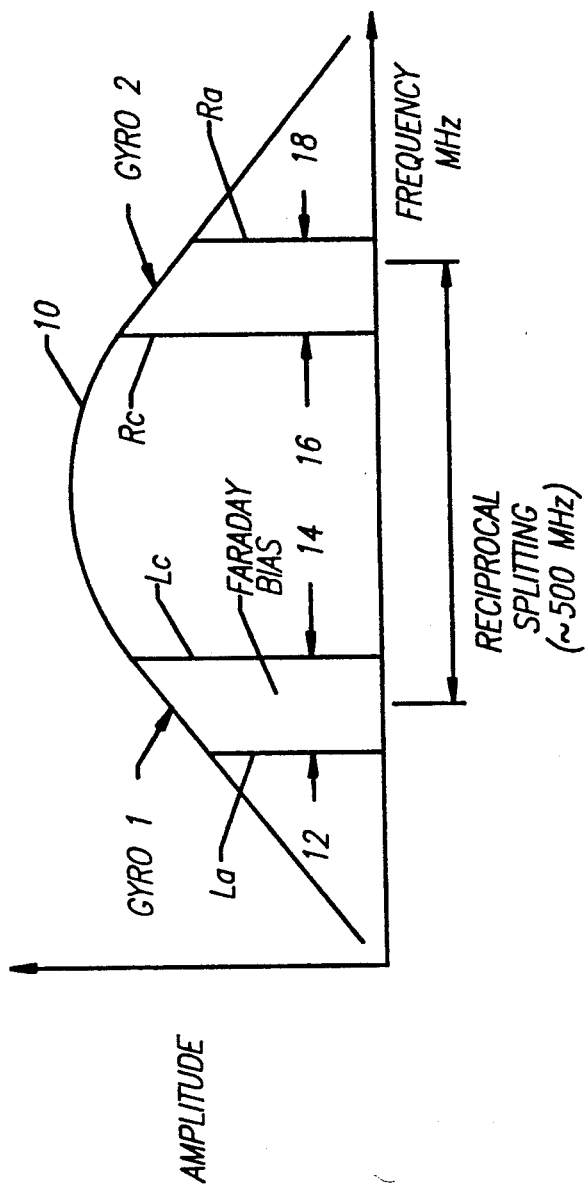
FIG. 1 is a PRIOR ART graphic representation of the Gain Profile curve for a non-planar multioscillator ring laser gyroscope having an intracavity Faraday Rotator and, showing both reciprocal and Faraday splitting of the multimode resonant frequencies of the ring laser gyroscope.

The signal separation circuitry 50 shown in FIG. 2 is an idealized functional embodiment which performs the same function that has been previously been accomplished using stacked quarterwave plates and optical polarizers. The temperature stability and alignment problems with the prior art optical stack are significant drawbacks of such a scheme, making the embodiment shown in FIG. 1 preferable as an all electronic system. The functional embodiment shown in FIG. 2 is practiced as shown and in an alternative embodiment as in FIG. 3. FIG. 2 shows a signal separation scheme capable of extracting the frequency differences between counter-propagating light beams in the gyroscope cavity. This frequency difference is a function of the amount of Faraday rotation produced by the Faraday rotator assembly 38 in the cavity and the rotation rate of the gyroscope. In general, the frequencies present at the circuit outputs 59 [2CA Cos $(\omega_c-\omega_a)$t] and 60 [2CB Cos $(\omega_c-\omega_b)$t] will be identical at zero rotation rate. A rotation rate other than zero causes one output frequency to become higher and the other to become lower. Higher rotation rates produce proportionally greater frequency differences between outputs. Reversing the rotation direction reverses the process, and the output that was lower in frequency becomes the higher frequency. Ideally there is only a single frequency present on each output at any particular rotation rate.

In order to understand the function of circuits shown in FIG. 2, it is helpful to formulate equations corresponding to the photodetectors output signals (from points 51 and 52) as these signals are processed within the separation circuitry 50.

Equations 1 and 2 show the signals present at points 51 and 52 of FIG. 2 as follows: At point 51, HET A =

$$A \cos \omega_a t + B \cos \omega_b t; \quad [EQ\ 1]$$

while at point 52, HET B =

$$A \cos (\omega_a t - \pi/2) + B \cos (\omega_b t + \pi/2). \quad [EQ\ 2]$$

A local oscillator 62, running at between 0.5 and 20 MHz, provides the following signal at point 53:

$$LO_a = C \cos \omega_c t. \quad [EQ\ 3]$$

The local oscillator output signal is then phase shifted by the 90° phase shifter 68, to produce a signal at point 54, which follows:

$$LO_b = C \cos (\omega_c t - \pi/2). \quad [EQ\ 4]$$

The signal at 53 is then mixed by the modulator or multiplier 64, with the HET A signal at 51, to produce an output signal at point 55 as follows:

$$LO_a \times HET\ A = C \cos \omega_c t\ (A \cos \omega_a t + B \cos \omega_b t); \quad [EQ\ 5]$$

Likewise, the signal at 54 is mixed by the modulator or multiplier 66 with the HET B signal at 52, to produce an output signal at point 56 as follows:

$$LO_b \times HET\ B = C \cos (\omega_c t - \pi/2) * (A \cos (\omega_a t - \pi/2) + B \cos (\omega_b t + \pi/2)). \quad [EQ\ 6]$$

The system filters (using low pass filters 70 and 72) the signals present at 55 and 56 [EQ 5 AND EQ 6], rejecting the $(\omega_c+\omega_a)$, $(\omega_c+\omega_b)$) terms in such a manner that at 57 the output signal is:

$$CA \cos (\omega_c-\omega_a)t + CB \cos (\omega_c-\omega_b)t \quad [EQ\ 7];$$

while the signal as point 58 is in the form of:

$$CA \cos (\omega_c-\omega_a)t - CB \cos (\omega_c-\omega_b)t. \quad [EQ\ 8]$$

By adding the signals at points 57 and 58 at the summer 74, the resulting output signal A at point 59 is:

$$SIGNAL\ A = EQ\ 7 + EQ\ 8 = 2CA \cos (\omega_c-\omega_a)t \quad [EQ\ 9];$$

and, the resulting output signal B at point 60, after the signals at point 57 and 58 are subtracted (at the difference summer 76), provides a resulting beat signal as follows:

$$SIGNAL\ B = EQ\ 7 - EQ\ 8 = 2CB \cos (\omega_c-\omega_b)t. \quad [EQ\ 10]$$

Using Equations 9 and 10, one would compare CA and CB terms to also control the gyroscope pathlength, to compensate for temperature induced changes in the optical pathway 40a-d. In this manner, a local oscillator-based output optics detection system is disclosed which allows a low cross-talk separation and detection of the rotational and sense of rotation information from the multioscillator ring laser gyroscope without the need for complex optics. The difference in amplitudes CA and CB yields the difference between the LCP and RCP intensities.

Figure 3:
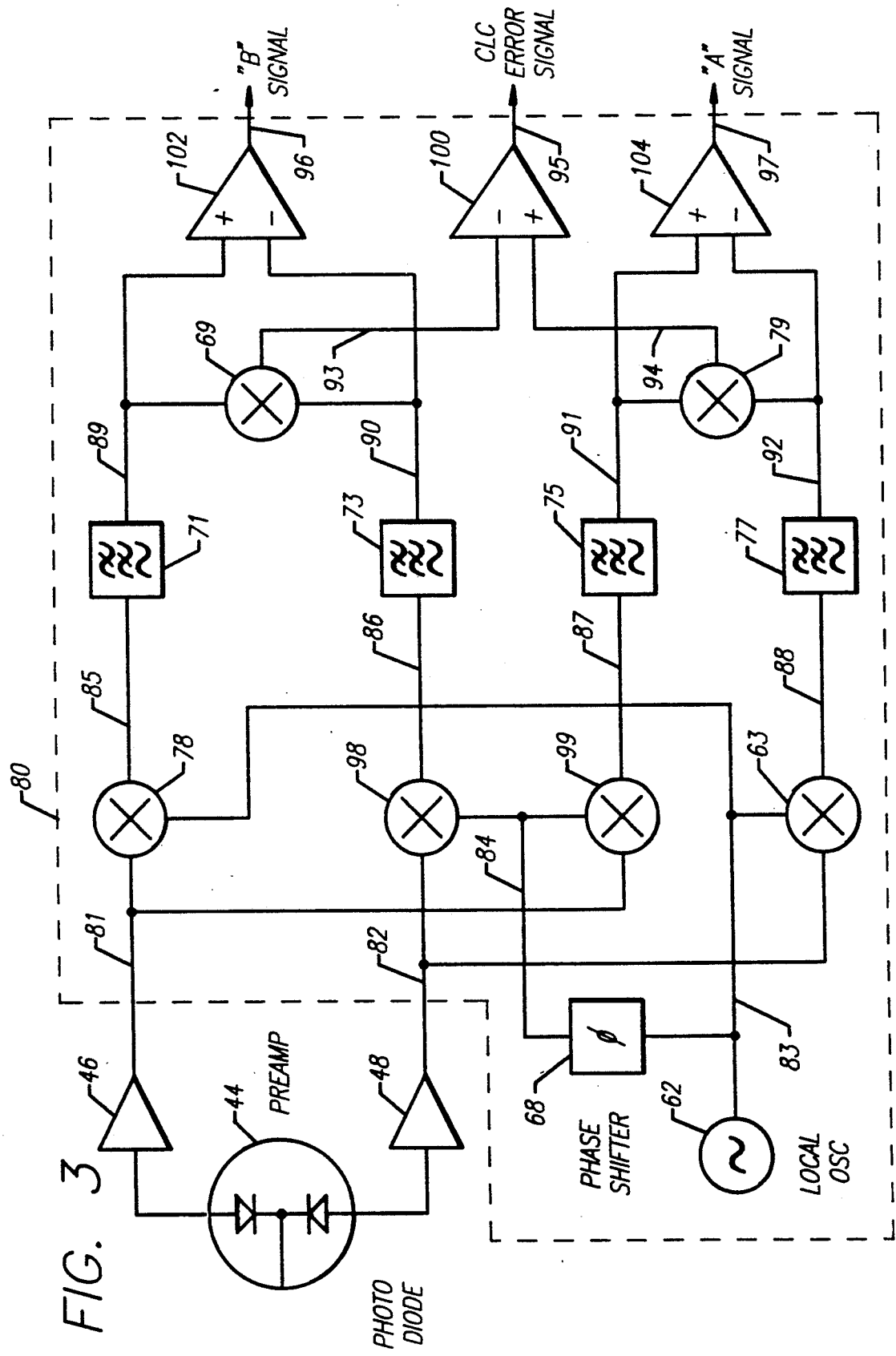
FIG. 3 is a schematic diagram of an alternative embodiment of the Rotational Sensing system, which includes a signal separation system having a local oscillator-based signal separation circuit.

FIG. 3 shows a scheme which is an alternative embodiment to the signal separation scheme, as heretofore disclosed in FIG. 2. As with FIG. 2, the optical heterodyne signals produced by the multioscillator ring laser gyroscope are detected by a set of quadrature-spaced photodetectors 44 (output detectors HET A and B of FIG. 2). Also as is FIG. 2, a pair of pre-amplifiers 46 and 48 amplify the output signals from the photodetectors 44.

In order to understand the function of circuits of the alternative embodiment shown in FIG. 3, it is helpful to formulate equations for current from the photodetectors 44 through the local oscillator-based output detection circuitry 80. The signals which appear at lines 81 (EQ 1) and 82 (EQ 2) may be designated respectively:

$$HET\ A = A \cos \omega_a t + B \cos \omega_b t;\ and, \quad [EQ\ 1]$$

$$HET\ B = A \cos (\omega_a t - \pi/2) + B \cos (\omega_b t + \pi/2). \quad [EQ\ 2]$$

As with the embodiment of FIG. 2, a local oscillator 62 (having a range of from 0.5 to 20 MHz) produces the following signal at line 83:

$$LO_a = C \cos \omega_c t. \quad [EQ\ 3]$$

Also, the output signal from the local oscillator 62 is phase shifted by a 90° Phase Shifter 68, producing a phase shifted signals at line 84 as the following equation:

$$LO_b = C \cos (\omega_c t - \pi/2). \quad [EQ\ 4]$$

Each of the output signals from the photodetectors 44 (HET A and HET B) are then mixed with each of the local oscillator signals ($LO_a$ and $LO_b$) producing the following four combinations:

(1) At the First Stage Modulator multiplier 78, the signals from line 81 (HET A) and line 83 ($LO_a$) are mixed, producing the following output signal at line 85:

$$LO_a \times HET\ A = C \cos \omega_c t\ (A \cos \omega_a t + B \cos \omega_b t). \quad [EQ\ 5]$$

(2) At the First Stage Modulator multiplier 98, the signals from line 82 (HET B) and line 84 ($LO_b$) are mixed, producing the following output signal at line 86:

$$LO_b \times HET\ B = C \cos (\omega_c t - \pi/2) * (A \cos (\omega_a t - \pi/2) + B \cos (\omega_b t + \pi/2)); \quad [EQ\ 6]$$

(3) At the First Stage Modulator multiplier 99, the signals from line 81 (HET A) and line 84 ($LO_b$) are mixed, producing the following output signal at line 87:

$$LO_b \times HET\ A = C \cos (\omega_c t - \pi/2) * (A \cos \omega_a t + B \cos \omega_b t); \quad [EQ\ 7]$$

and, (4) At the First Stage Modulator multiplier 63, the signals from line 82 (HET B) and line 83 ($LO_a$) are mixed, producing the following output signal at line 88:

$$LO_a \times HET\ B = C \cos \omega_c t * (A \cos (\omega_a t - \pi/2) + B \cos (\omega_b t + \pi/2)). \quad [EQ\ 8]$$

The signals along lines 85, 86, 87, and 88 are respectively low pass filtered by filters 71, 73, 75, and 77 as shown in FIG. 3. By passing the signals along lines 85 through 88 through each of their respective low pass filters 71, 73, 75, and 77, the (($\omega_c+\omega_a$) and ($\omega_c+\omega_b$)) terms are rejected. Thus at the output of low pass filter 71 (line 89), only the following signal remains:

$$CA \cos (\omega_c - \omega_a)t + CB \cos (\omega_c - \omega_b)t. \quad [EQ\ 9]$$

Similarly, the low pass filtering (at filter 73) of the signal along line 86 leaves the following expression at line 90:

$$CA \cos (\omega_c - \omega_a)t - CB \cos (\omega_c - \omega_b)t. \quad [EQ\ 10]$$

Also, the low pass filtering (at filter 75) of the signal along line 87 leaves the following expression at line 91:

$$CA \cos ((\omega_c - \omega_a)t - \pi/2) + CB \cos ((\omega_c - \omega_b)t - \pi/2); \quad [EQ\ 11]$$

and finally, the low pass filtering (at filter 77) of the signal along line 88 leaves the following expression at line 92:

$$CA \cos ((\omega_c - \omega_a)t + \pi/2) + CB \cos ((\omega_c - \omega_b)t - \pi/2). \quad [EQ\ 12]$$

In this alternative embodiment shown in FIG. 3, the filtered output signals from lines 89 and 90 are then mixed by the Second Stage multiplier 69, producing the following output signal along line 93:

$$[EQ\ 9] \times [EQ\ 10] = C^2 A^2 \cos^2((\omega_c - \omega_a)t) - C^2 B^2 \cos^2((\omega_c - \omega_b)t) = C^2(A^2 \cos^2((\omega_c - \omega_a)t - B^2 \cos^2((\omega_c - \omega_b)t) \quad [EQ\ 13].$$

Likewise, the filtered output signals from lines 91 and 92 are then mixed by the Second Stage multiplier 79, producing the following output signal along line 94:

$$[EQ\ 11] \times [EQ\ 12] = C^2 B^2 \cos^2((\omega_c - \omega_b)t - \pi/2) - C^2 A^2 \cos^2((\omega_c - \omega_a)t - \pi/2) = C^2[B^2 \cos^2((\omega_c - \omega_b)t - \pi/2) - A^2 \cos^2((\omega_c - \omega_a)t - \pi/2)]. \quad [EQ\ 14]$$

The difference of signals 94 [EQ 14] and 93 [EQ 13] performed at difference amplifier 100 produces the CLC error signal at line 95. The output signal CLC error = [EQ 14] − [EQ 13]

$$= C^2 (B^2 - A^2). \quad [EQ\ 15]$$

This measures the difference in amplitudes between the LCP and RCP gyroscopes, and hence, gives a CLC discriminant. By comparing $A^2$ with $B^2$, slope can be determined as follows:
1) if $A^2 > B^2$, then the slope is positive;
2) if $B^2 > A^2$, then the slope is negative; and,
3) if $B^2 = A^2$, then the slope is zero, and the gain curve is in an optimum cavity length control position. Thus, a direct method of cavity length control is available using the embodiment taught in FIG. 3.

Rotational information may be obtained at amplifiers 102 and 104, along lines 96 and 97, respectively as follows:

$$\text{OUTPUT SIGNAL } B = [EQ\ 9] - [EQ\ 10] 2CB \cos (\omega_c - \omega_b)t; \quad [EQ\ 16]$$

and, $$\text{OUTPUT SIGNAL } A = [EQ\ 11] - [EQ\ 12] 2CA \sin (\omega_c - \omega_a)t. \quad [EQ\ 17]$$

In this manner, separation of $\omega_a$ from $\omega_b$ has been achieved, allowing rotational rate and direction to be measured.

Thus, it is a function of the present invention to electronically separate the Sagnac effect modulated Faraday biased beat frequencies (suppressed carrier modulated signals) into clockwise and anti-clockwise components of each pair of left and right circularly polarized high frequency optical signals, or their electronic signal counterparts, as produced by the photodetectors 44), so that a count number or other signal representing the present rate of rotation experienced by the ring laser gyroscope may be obtained. With reference to FIG. 3 only, the heterodyned signals are separated and analyzed to produce a CLC error signal useful to carry out cavity length control.

Thus, there has been disclosed a multioscillator ring laser gyroscope output optics rotational sensing system that can operate with a simple optics scheme where the required signal separation is performed fully electronically and with the use of a local oscillator. While a preferred and alternative embodiments for performing rotation sensing have been disclosed, it can be seen that other equivalent alternative embodiments may also be apparent beyond the particular embodiments disclosed. Thus, it is apparent that the appended claims which follow are intended to cover not only the embodiments described in this application, but alternative equivalents as well.

What is claimed is:

1. In a multioscillator ring laser gyroscope, a rotational sensing system including output optics detection system for sensing the rotational rate of said gyroscope, comprising:

an output prism, affixed to an output mirror of a ring resonator cavity of a multioscillator ring laser gyroscope, suitable for heterodyning high frequency optical signals, said signals being grouped into pairs of right and left circularly polarized light, each polarized pair of signals having a clockwise component and an anti-clockwise component;

said prism producing output signals which are Sagnac effect modulated Faraday biased beat frequency signals, in the form of optical suppressed carrier modulation signals;

photo-electronic transducer means for electronically detecting said high frequency optical signals and converting said signals into heterodyned electronic signals;

electronic signal separation means for processing said heterodyned electronic signals, including a local oscillator, corresponding to said suppressed carrier modulation signals from said photo-electronic transducer means;

whereby, the suppressed carrier modulation signal from said photo-electronic transducer means is electronically separated into clockwise and anti-clockwise component output signals of at least one of said polarized pairs, said components corresponding to each of the multioscillator ring laser gyroscope signals, so that rotational rate and direction may be measured.

2. The multioscillator ring laser gyroscope rotational sensing system of claim 1, wherein:

said photo-electronic transducer means includes a set of at least two photodetectors separated a predetermined distance apart, providing said suppressed carrier modulation electronic output signals; and, said electronic signal separation means for processing said suppressed carrier modulation electronic output signals includes:

a local oscillator means operatively associated with said at least two photodetectors;

at least one phase shifter circuit, said at least one phase shifter circuit being operatively associated with said local oscillator, said phase shift circuit operating to phase shift the output signals from said local oscillator a pre-determined phase angle;

a set of at least two mixing circuits, one of each mixing circuit combining first suppressed carrier modulation output signals from a first photodetector with output signals from said local oscillator, producing first heterodyned suppressed carrier output signals;

a second of said at least two mixing circuits combining second suppressed carrier modulation output signals from a second photodetector with phase-shifted output signals from said local oscillator, producing second heterodyned suppressed carrier output signals;

a set of at least two combining circuits, one of each combining circuit adding first heterodyned suppressed carrier modulation output signals to second heterodyned suppressed carrier modulation output signals, producing a first component separated suppressed carrier output signal; and, a second of said at least two combining circuits subtracting first heterodyned suppressed carrier modulation output signals from second heterodyned suppressed carrier modulation output signals, producing a second component separated suppressed carrier output signal;

whereby said suppressed carrier modulation signals from said photo-electronic transducer means is electronically separated into clockwise and anti-clockwise component output signals of at least one of said polarized pairs, and corresponding to each of the component frequency signals, so that rotational rate and direction may be measured.

3. The multioscillator ring laser gyroscope rotational sensing system of claim 2, said electronic signal separation means for processing said suppressed carrier modulation electronic output signal, further including:

a set of at least two low pass filter circuits, a first of said at least two low pass filter circuits for filtering said first heterodyned suppressed carrier modulation output signals, producing first heterodyned and filtered suppressed carrier modulation output signals; and, a second of said at least two low pass filter circuits for filtering said second heterodyned suppressed carrier modulation output signals, producing second heterodyned and filtered suppressed carrier modulation output signals;

whereby, said suppressed carrier modulation signals from said photo-electronic transducer means is filtered prior to being separated by said electronic signal separation means, eliminating unwanted signals from the output of said electronic separation means.

4. The multioscillator ring laser gyroscope rotational sensing system of claim 1, wherein:

said photo-electronic transducer means includes a set of at least two photodetectors separated a predetermined distance apart, providing said suppressed carrier modulation electronic output signals; and, said electronic signal separation means for processing said suppressed carrier modulation electronic output signals includes:

a local oscillator means operatively associated with said at least two photodetectors;

at least one phase shifter circuit, said at least one phase shifter circuit being operatively associated with said local oscillator, said phase shift circuit operating to phase shift the output signals from said local oscillator a pre-determined phase angle;

a first set of at least four mixing circuits, a first of said mixing circuits combining first suppressed carrier modulation output signals from a first photodetector with output signals from said local oscillator, producing first heterodyned suppressed carrier output signals;

a second of said at least four mixing circuits combining a second of said suppressed carrier modulation output signals from a second photodetector with phase-shifted output signals from said local oscillator, producing second heterodyned suppressed carrier output signals;

a third of said at least four mixing circuits combining said first suppressed carrier modulation output signals from said first photodetector with phase-shifted output signals from said local oscillator, producing third heterodyned suppressed carrier output signals;

a fourth of said first set of at least four mixing circuits, combining second suppressed carrier modulation output signals from a second photodetector with output signals from said local oscillator, producing fourth heterodyned suppressed carrier output signals;

a second set of at least two mixing circuits, a first of said second set mixing circuits combining said first heterodyned suppressed carrier modulation output signals with said second heterodyned suppressed carrier modulation output signals, producing first cavity length control signals;

a second of said second set mixing circuits combining said third heterodyned suppressed carrier modulation output signals with said fourth heterodyned suppressed carrier modulation output signals, producing second cavity length control signals;

a set of at least three combining circuits;

a first and second of said at least three combining circuits respectively taking the difference between first heterodyned suppressed carrier modulation output signals and second heterodyned suppressed carrier modulation output signals and said second combining circuit taking the difference between said third heterodyned suppressed carrier modulation output signals and said fourth heterodyned suppressed carrier modulation output signal, producing first and second separated difference frequency component suppressed carrier output signals, from which rotational rate and direction may be determined;

a third of said at least three combining circuits respectively taking the difference between said first and second cavity length control signals, producing cavity length control error signals from which the optical path of said multioscillator ring laser gyroscope may be monitored and controlled.

5. The multioscillator ring laser gyroscope rotational sensing system of claim 2, wherein:
said suppressed carrier modulation signals from said photoelectronic transducer means is electronically separated into clockwise and anti-clockwise component output signals of at least one of said polarized pairs, said polarized pairs having a bandspread from as low as 0.5 MHz and as high as 20 MHz.

6. In a multioscillator ring laser gyroscope, a method for rotational sensing comprising the steps of:
heterodyning high frequency optical signals with an output prism affixed to an output mirror of a ring resonator cavity of said multioscillator ring laser gyroscope, said optical signals being grouped into pairs of right and left circularly polarized light, each polarized pair of signals having a clockwise component and an anti-clockwise component;

said output signals taking the form of suppressed carrier Sagnac effect modulated Faraday biased beat frequency signals;

electronically detecting said high frequency optical signals with photo-electronic transducer means;

converting said signals into heterodyned electronic signals with said photo-electronic transducer means;

processing said heterodyned electronic signals with electronic signal separation means, including a local oscillator;

whereby, the suppressed carrier modulation signal from said photo-electronic transducer means is electronically separated into clockwise and anti-clockwise component output signals of at least one of said polarized pairs, so that rotational rate and direction may be measured.

7. The method for rotational sensing in a multioscillator ring laser gyroscope of claim 6, further including the steps of:
processing the modulated output optical signals from said multioscillator ring laser gyroscope through a set of at least two photodetectors separated a predetermined distance apart, thereby providing said suppressed carrier modulation electronic output signals; and, separating said electronic signals, which further includes:
generating a heterodyne frequency by use of a local oscillator means operatively associated with said at least two photodetectors;

phase shifting the output signals from said local oscillator a pre-determined phase angle through at least one phase shifter circuit;

mixing first suppressed carrier modulation output signals from a first photodetector with output signals from said local oscillator, thereby producing second heterodyned suppressed carrier output signals;

producing first heterodyned suppressed carrier output signals;

mixing second suppressed carrier modulation output signals from a second photodetector with output signals from said local oscillator, thereby producing second heterodyned suppressed carrier output signals;

adding said first heterodyned suppressed carrier modulation output signals to said second heterodyned suppressed carrier modulation output signals, producing a first component separated suppressed carrier output signal; and, subtracting said first heterodyned suppressed carrier modulation output signals from said second heterodyned suppressed carrier modulation output signals, producing a second component separated suppressed carrier output signal;

whereby said suppressed carrier modulation signals from said photo-electronic transducer means is electronically separated into clockwise and anti-clockwise component output signals so that rotational rate and direction may be measured.

8. The method for rotational sensing in a multioscillator ring laser gyroscope of claim 7, wherein, separating said electronic signals further includes the step of:
filtering said first and second heterodyned suppressed carrier modulation output signals, using a set of at least two low pass filter circuits;

thereby, producing first and second heterodyned and filtered suppressed carrier modulation output signals;

whereby, said suppressed carrier modulation signals from said photo-electronic transducer means are filtered prior to being separated by said electronic signal separation means, eliminating unwanted signals from the output of said electronic separation means.

9. The method for rotational sensing in a multioscillator ring laser gyroscope of claim 7, wherein, separating said electronic signals further includes the steps of:
mixing said first and second suppressed carrier modulation output signals from said first and second photodetectors with output signals from said local oscillator, producing first and second heterodyned suppressed carrier output signals;

mixing said first and second suppressed carrier modulation output signals from said first and second photodetectors with phase-shifted output signals from said local oscillator, producing third and fourth heterodyned suppressed carrier output signals;

mixing said first and second heterodyned suppressed carrier output signals, producing a first cavity length control signal;

mixing said third and fourth heterodyned suppressed carrier output signals, producing a second cavity length control signal;

subtracting said first cavity length control signal from said second cavity length control signal, thereby determining a cavity length control error signal which can be used to control ring laser gyroscope cavity length; and, subtracting said second heterodyned suppressed carrier output signal from said first heterodyned suppressed carrier output signal, and said fourth heterodyned suppressed carrier output signal from said third heterodyned suppressed carrier output signal; thereby, producing a first and second separated difference frequency component suppressed carrier output signals, from which rotational rate and direction may be determined.

* * * * *